US008366052B1

(12) United States Patent
Lutke et al.

(10) Patent No.: US 8,366,052 B1
(45) Date of Patent: Feb. 5, 2013

(54) DETACHABLE INFLATION SYSTEM FOR AIR VEHICLES

(75) Inventors: Kevin R. Lutke, Huntington Beach, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 544 days.

(21) Appl. No.: 12/582,706

(22) Filed: Oct. 20, 2009

(51) Int. Cl.
*B64G 1/00* (2006.01)
(52) U.S. Cl. ............... 244/158.3; 244/123.11; 244/139
(58) Field of Classification Search ............ 244/5, 24, 244/25, 29, 30, 119, 123.11, 123.1, 125, 244/128, 129.4, 129.1, 136, 137.1, 137.4, 244/62, 158.3, 171.3, 159.2
See application file for complete search history.

(56) References Cited

U.S. PATENT DOCUMENTS

| | | | |
|---|---|---|---|
| 6,199,796 B1 | 3/2001 | Reinhard et al. | |
| 6,260,797 B1 * | 7/2001 | Palmer | 244/49 |
| 6,347,769 B1 | 2/2002 | To et al. | |
| 6,892,981 B2 * | 5/2005 | Lipeles | 244/13 |
| 7,073,749 B2 * | 7/2006 | Krill et al. | 244/2 |
| 7,306,187 B2 * | 12/2007 | Lavan | 244/123.11 |
| 7,318,565 B2 | 1/2008 | Page | |
| 2006/0261213 A1 * | 11/2006 | Lavan | 244/30 |
| 2008/0083847 A1 * | 4/2008 | Mau | 244/13 |
| 2009/0108135 A1 * | 4/2009 | Shaw | 244/158.3 |
| 2009/0206196 A1 * | 8/2009 | Parks et al. | 244/49 |
| 2009/0224108 A1 | 9/2009 | Lutke et al. | |
| 2010/0044507 A1 * | 2/2010 | Smith et al. | 244/110 R |
| 2010/0288875 A1 * | 11/2010 | Barnes et al. | 244/96 |

OTHER PUBLICATIONS

ILC Dover, "Low Packing Volume Inflatable UAV Wing", 2 pages from ILC Dover website, <http://www.ilcdover.com/products/aerospace_defense/uavwings.htm>.
Vertigo Inc., "Inflatable Wings", 3 pages from Vertigo Inc. website, <http://www.vertigo-inc.com/inflatable_wings/>.
ILC Dover, "UAV Inflatable & Rigidized Wings", 2 pages from ILC Dover website, <http://www.ilcdover.com/products_ad_ei_is_uav_wings.cfm>.
NASA Dryden Flight Research Center, "Inflatable Wing Flights Prove Concept", Jul. 9, 2001, 2 pages from NASA website, <http://www.nasa.gov/centers/dryden/news/NewsRelease/2001/01-46.html>.
Systima Technologies, Inc., "Gas Generators and Inflation Products", 2 pages from Systima Technologies, Inc. website, <http://www.systima.com/prod/products.html>.
Cadogan, D., et al., "Inflatable and Rigidizable Wings for Unmanned Aerial Vehicles", AIAA 2003-6630, ILC Dover Inc., pp. 1-9.
Cadogan, D., et al., "Morphing Inflatable Wing Development for Compact Package Unmanned Aerial Vehicles", AIAA 2004-1807, SDM Adaptive Structures Forum, pp. 1-13.
Rowe, J., et al., "Development of a Finite Element Model of Warping Inflatable Wings", AIAA, pp. 1-19.
Smith, S., et al., "A High-Altitude Test of Inflatable Wings for Low-Density Flight Applications", AIAA, pp. 1-13.

(Continued)

*Primary Examiner* — Tien Dinh
*Assistant Examiner* — Michael A Fabula

(57) ABSTRACT

A detachable inflation system for use with an air vehicle having at least one inflatable structure. The detachable inflation system comprises a pallet structure. The detachable inflation system further comprises an initial inflation system, attached to the pallet structure, that provides one or more compressed fluids. The initial inflation system is connected to an inflation distribution system in the air vehicle for distributing the one or more compressed fluids into the inflatable structure to inflate the inflatable structure. The detachable inflation system further comprises a detachable parachute.

22 Claims, 14 Drawing Sheets

OTHER PUBLICATIONS

Cadogan, D., et al., "Inflatable Composite Habitat Structures for Lunar and Mars Exploration", 49th International Astronautical Congress Sep. 28-Oct. 2, 1998, Melbourne, Australia, pp. 1-8.

Wikipedia, definition of "wing warping", 2 pages from Wikipedia website, <http://en.wikipedia.org/wiki/Wing_warping>.

* cited by examiner

DETACHABLE INFLATION SYSTEM FOR AIR VEHICLES

BACKGROUND

1) Field of the Disclosure

The disclosure relates to air vehicles. In particular, the disclosure relates to unmanned and manned air vehicles with detachable inflation systems and devices.

2) Description of Related Art

Unmanned air vehicles (UAVs) are uncrewed aircraft vehicles that are capable of controlled, sustained, powered level flight. Such UAVs may be used in commercial, civil, and military applications. UAVs may be categorized in terms of their altitude and endurance or flight duration. High altitude, long endurance (HALE) UAVs are those that can typically fly at an altitude of over 30,000 feet and for six hours or more. HALE UAV configurations typically benefit from large, high aspect ratio wings. An aerially deployed HALE UAV may use a launch vehicle, such as an intercontinental ballistic missile, to rapidly deploy anywhere on Earth. However, such a UAV must deploy from a comparatively small volume present in a launch vehicle such as a nose cone. This may make traditional aircraft wings infeasible. As such, aerially deployable UAVs may use inflatable wings that can be stored deflated and packed, greatly reducing the volume the UAV occupies. The wings may be constructed of a fabric, coated so as to prevent gas leaks, and filled with a high pressure gas. The wings typically require a large volume or mass of high pressure gas for initial inflation and sometimes a smaller volume or mass of high pressure gas to replenish or make up for lost differential pressure which may result from leaks, heating and cooling due to diurnal cycling or altitude change, or changes in ambient pressure. For example, the additional replenishment gas may be used for making up for leakage and can be referred to as "make up gas". With typical aircraft, the aircraft starts from the ground and ascends, and the atmospheric pressure decreases. With aerially deployed UAVs, the UAV starts from a higher altitude and descends. In order to have a structurally rigid wing, a minimum differential pressure must be maintained across the skin of the wing. As the UAV descends, the atmospheric pressure increases, so that the change in pressure decreases. Thus, additional make up gas may need to be pumped into the inflatable wings or other inflatable structures to make up for this effect.

Known UAVs with inflatable wings or other inflatable structures may leave their inflation apparatus on the ground. However, this can prevent the use of the replenishment or make up gas which may be necessary for the flight or mission. In addition, this can limit the distance or range that the UAV can cover if the inflatable wings lose pressure during the flight.

Alternatively, known UAVs with inflatable wings or other inflatable structures may carry their inflation apparatus internally within the UAV. High pressure gas is typically stored in inflation storage devices such as tanks or solid gas generator containers similar to solid rocket motors. Such tanks and solid gas generator containers are useless once they are empty and are typically retained on the UAV for the duration of a flight or mission. Retaining the storage tanks and the solid gas generator containers for the duration of a flight or mission may act as a weight and volume penalty to the UAV. This may increase the drag of the UAV and may reduce key performance parameters such as endurance, altitude, and payload. In addition, the wings have to be larger in order to accommodate the added weight, and the entire UAV must then increase in size to accommodate the larger wings. Moreover, when pressurized tanks or bottles are opened, as the gas expands, it cools, and cold fluid is injected into the inflatable wings or other inflatable structures. This requires that the inflatable wings or other inflatable structures be constructed of a material designed to withstand cold temperatures. Additionally, the cold gas has a higher density than if it were at ambient temperature requiring more gas than would have been necessary and venting as the gas expands after absorbing heat.

In addition, there are known systems to inflate the wings or other inflatable structures of UAVs without the use of stored compressed fluid. One known system uses a chemical reaction of solid materials that provides a high temperature exhaust or propellant to inflate the wings. However, this requires that the inflatable wings or inflatable structures be made of a high temperature resistant fabric that can withstand the high temperature exhaust. Burning such propellant inside the inflatable wings or inflatable structures requires the fabric and coatings to be insulated or capable of withstanding very high temperatures and local pressure spikes. This limits the types of fabrics or coatings available or requires insulation. Such options are likely to increase the overall weight of the UAV. Moreover, once the inflatable wings or other inflatable structures are inflated, the propellant may cool rapidly, and the inflatable wings or other inflatable structures must be re-pressurized. This may require additional gas generator cartridges, another combusting product, or another pressurized gas source.

Accordingly, there is a need for an air vehicle with one or more inflatable structures having a detachable inflation system that provides advantages over known systems.

SUMMARY

This need for an air vehicle with one or more inflatable structures having a detachable inflation system is satisfied. None of the known systems provide all of the numerous advantages discussed herein. Unlike known systems, embodiments of the system, apparatus, and method of the disclosure may provide one or more of the following advantages: provides an air vehicle having a detachable inflation system that carries an inflation system externally on the air vehicle in such a way that the components are easily accessible and the components are easily discarded or deployed when empty, while the air vehicle is still in flight; provides a detachable inflation system that is detachable from an air vehicle, such as a manned or unmanned vehicle, and that provides key system needs, such as power, compressed air, and decoys, and then is removable when the need is expended; provides a detachable inflation system having an inflation system that uses a combination of both storage devices having one or more compressed fluids and gas generators having one or more compressed fluids to combine hot and cold temperatures to obtain an acceptable temperature within the inflatable structures, so that the inflatable structures do not have to be constructed of special high temperature or low temperature resistant materials; provides a detachable inflation system that is considered an enabler for rapid deployable air vehicles in that it allows for compact storage and lower structural requirements by allowing critical systems to be disposable when no longer needed; provides a detachable inflation system that provides a mechanism to drop empty gas storage containers off the air vehicle to reduce weight and increase performance; provides a detachable inflation system that integrates items only needed to start the air vehicle; provides a detachable inflation system that can include one or more containers of a fuel or oxidizer to start the engine of the air vehicle at a high altitude if the engine requires it; provides an air vehicle having a separate initial inflation system on the detachable inflation system that can be discarded or deployed when used and a separate replenishment or make up gas system in the air vehicle that can be retained throughout the flight or mission, thus resulting in increased performance over the entire mission and reduced volume, weight, lift, drag; provides an air vehicle having a detachable inflation system that can result in lower fuel burn and overall reduced aircraft weight and can even influence propulsor selection; provides an air vehicle that has improved endurance, altitude, and payload capability; provides for a detachable inflation system that allows for compact storage and lower structural requirements by allowing critical systems to be disposable when no longer needed; and, provides a detachable inflation system that may be used with manned and unmanned air vehicles (UAVs), such as airplanes, spacecraft, and other vehicles and craft.

In an embodiment of the disclosure, there is provided an air vehicle. The air vehicle comprises a fuselage. The air vehicle further comprises at least one inflatable structure. The inflatable structure is inflatable and has an inflation distribution system for distributing one or more compressed fluids into the inflatable stricture to inflate the inflatable structure. The air vehicle further comprises a detachable inflation system. The detachable inflation system is detachably positioned on an external surface of the fuselage. The detachable inflation system comprises an initial inflation system that provides the one or more compressed fluids and distributes the one or more compressed fluids to the inflation distribution system.

In another embodiment of the disclosure, there is provided an air vehicle. The air vehicle comprises a fuselage. The air vehicle further comprises at least one inflatable structure. The inflatable structure is inflatable and has an inflation distribution system for distributing one or more compressed fluids into the inflatable structure to inflate the inflatable structure. The air vehicle further comprises a replenishment system positioned in the unmanned air vehicle for distributing an additional amount of the one or more compressed fluids into an inflated inflatable structure to replace lost differential pressure. The air vehicle further comprises a detachable inflation system detachably positioned on an external surface of the fuselage. The detachable inflation system comprises a pallet structure, an initial inflation system, attached to the pallet structure, that provides the one or more compressed fluids and distributes the one or more compressed fluids to the inflation distribution system, and a detachable parachute. The air vehicle further comprises a separation system for separating the detachable inflation system from the air vehicle. The air vehicle further comprises a control system comprising an electrical control subsystem and a computer control subsystem.

In another embodiment there is provided a detachable inflation system for use with an air vehicle having at least one inflatable structure. The detachable inflation system comprises a pallet structure. The detachable inflation system further comprises an initial inflation system, attached to the pallet structure, that provides one or more compressed fluids. The initial inflation system is connected to an inflation distribution system in the air vehicle for distributing the one or more compressed fluids into the inflatable structure to inflate the inflatable structure. The detachable inflation system further comprises a detachable parachute.

In another embodiment of the disclosure, there is provided a method of operating an air vehicle. The method comprises launching an air vehicle from a launching apparatus, such that the air vehicle is traveling at a flight velocity. The method further comprises inflating one or more inflatable wings on the air vehicle using an initial inflation system mounted on a detachable inflation system, the detachable inflation system being externally and detachably positioned on the air vehicle. The method may further comprise separating the detachable inflation system from the air vehicle.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 14:
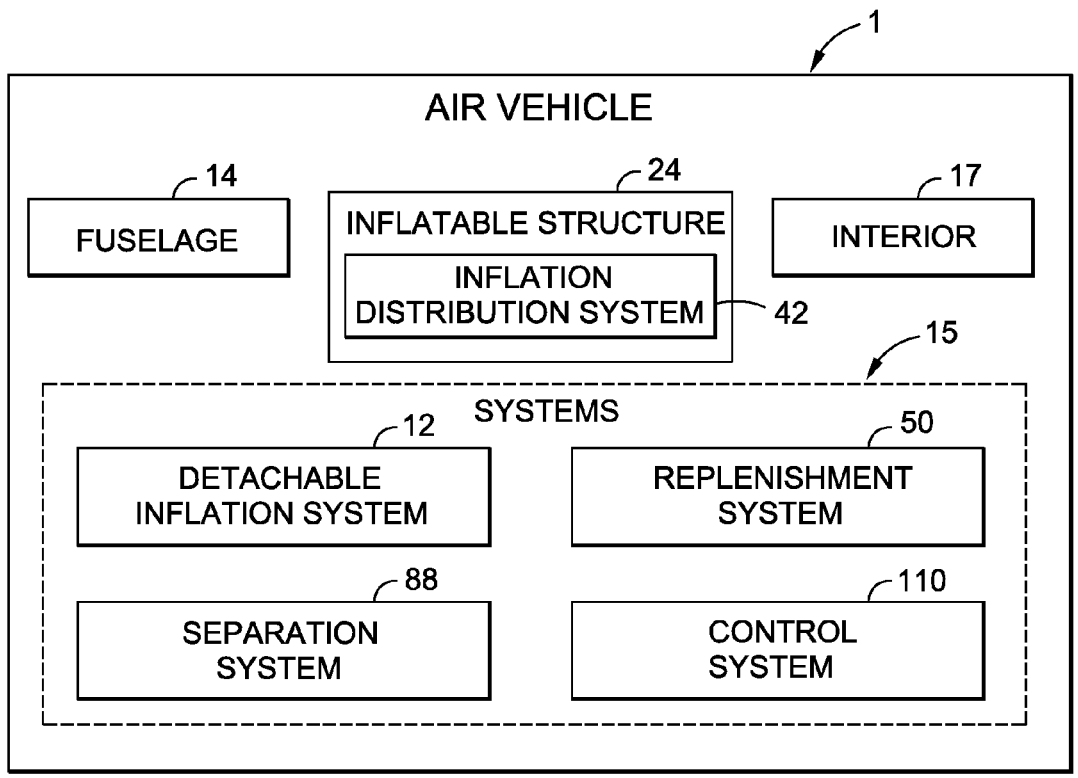
FIG. 14 is an illustration of an air vehicle in which an advantageous embodiment of a detachable inflation system may be implemented; and, FIG. 15 is an illustration of a detachable inflation system in accordance with an advantageous embodiment.

With reference to FIG. 14, an illustration of an air vehicle 1 is depicted in which an advantageous embodiment of a detachable inflation system 12 of the disclosure may be implemented. In this example, the air vehicle 1 may include a fuselage 14 with a plurality of systems 15, an interior 17, and at least one inflatable structure 24. The systems 15 preferably include the detachable inflation system 12, a replenishment system 50, a separation system 88, and a control system 110. However, other suitable systems may also be included.

Figure 15:
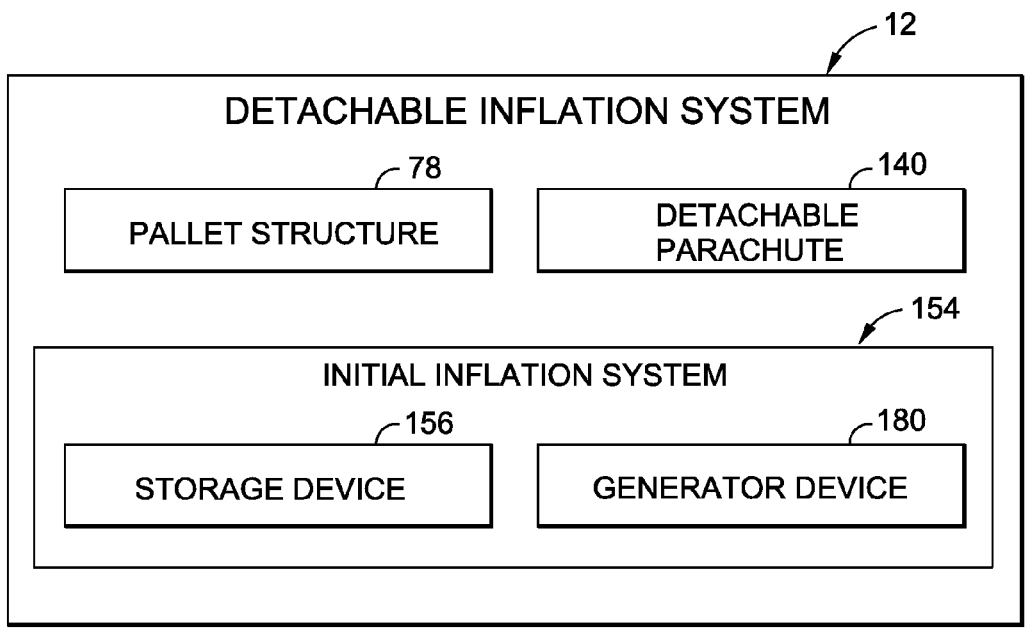

With reference to FIG. 15, an illustration of a detachable inflation system 12 in accordance with an advantageous embodiment is shown. In this illustrative example, the detachable inflation system 12 includes a pallet structure 78, a detachable parachute 140, and an initial inflation system 154. The initial inflation system 154 preferably includes one or more storage devices 156 and one or more generator devices 180.

Figure 1:
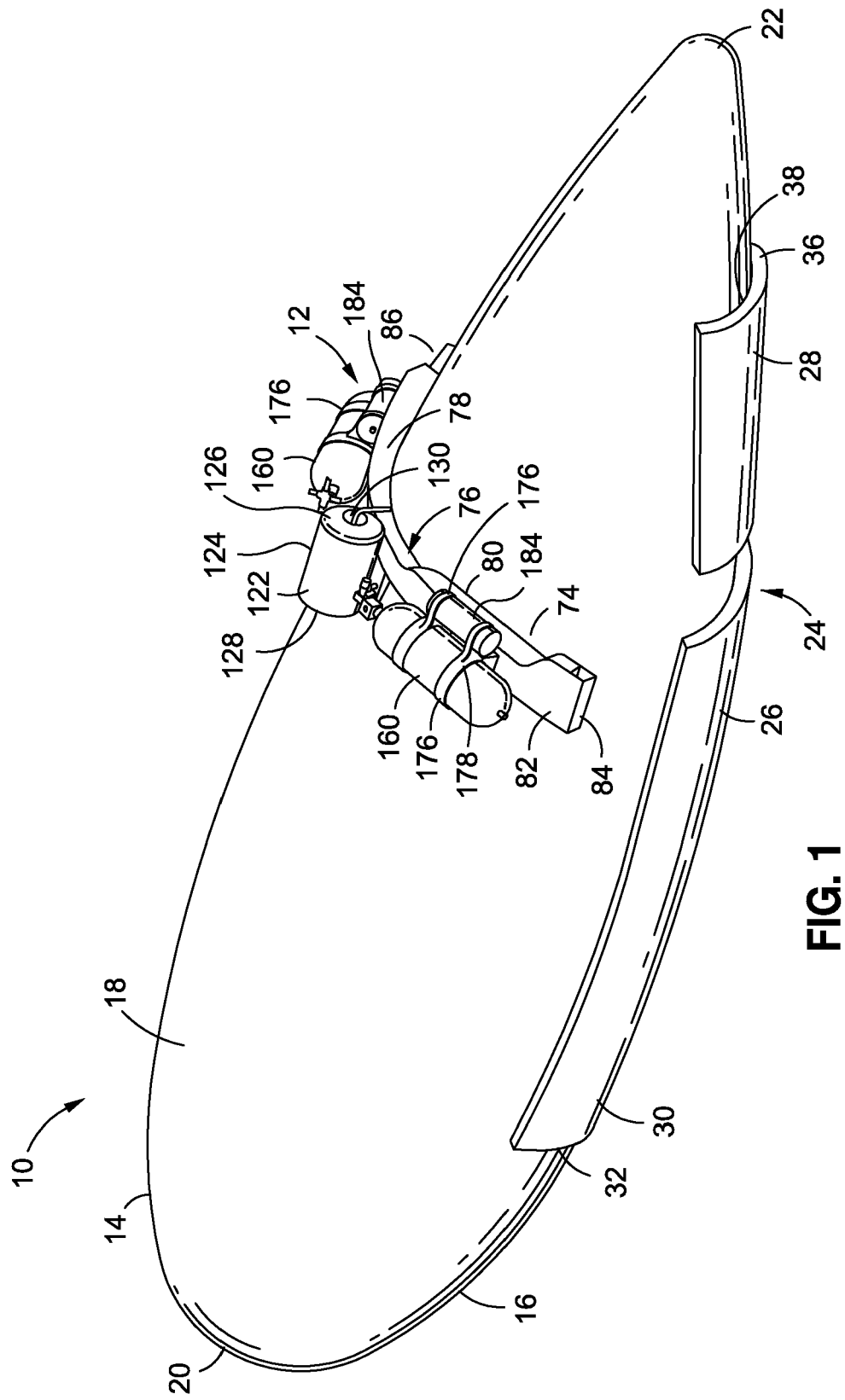
FIG. 1 is an illustration of a bottom perspective view of an embodiment of an unmanned air vehicle with an embodiment of a detachable inflation system of the disclosure.
Figure 2:
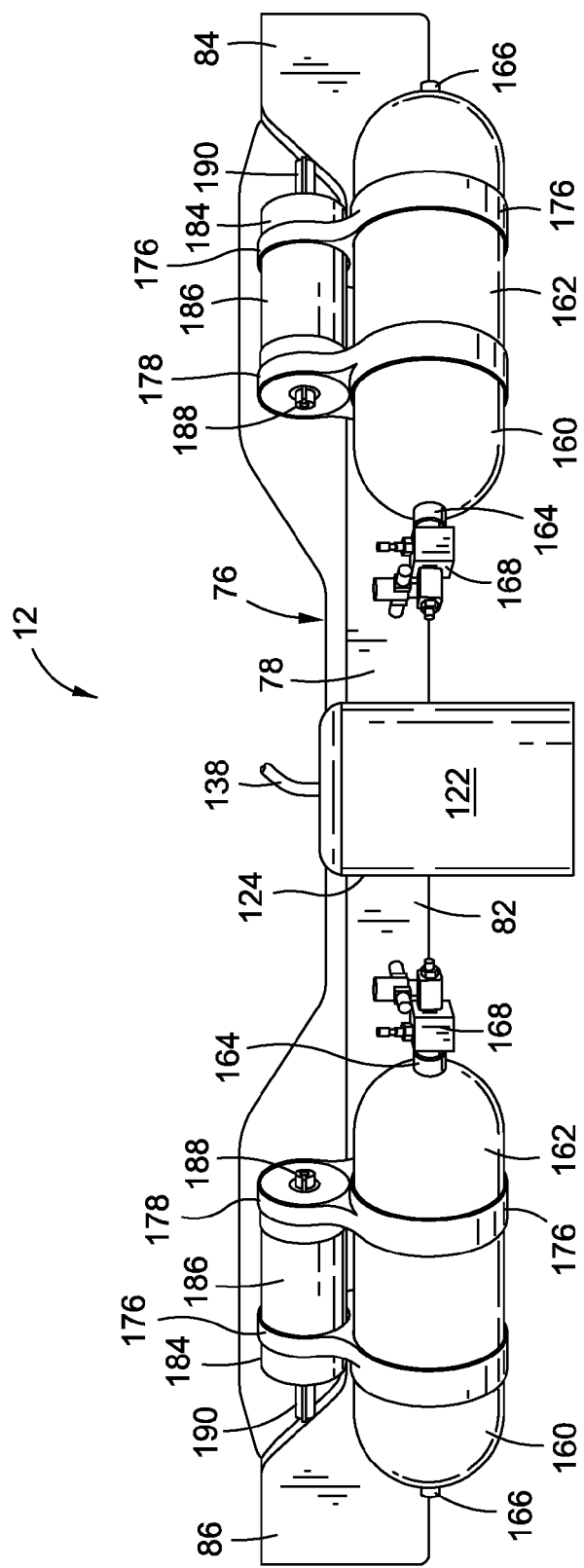
FIG. 2 is an illustration of a bottom perspective view of the detachable inflation system of FIG. 1.
Figure 10:
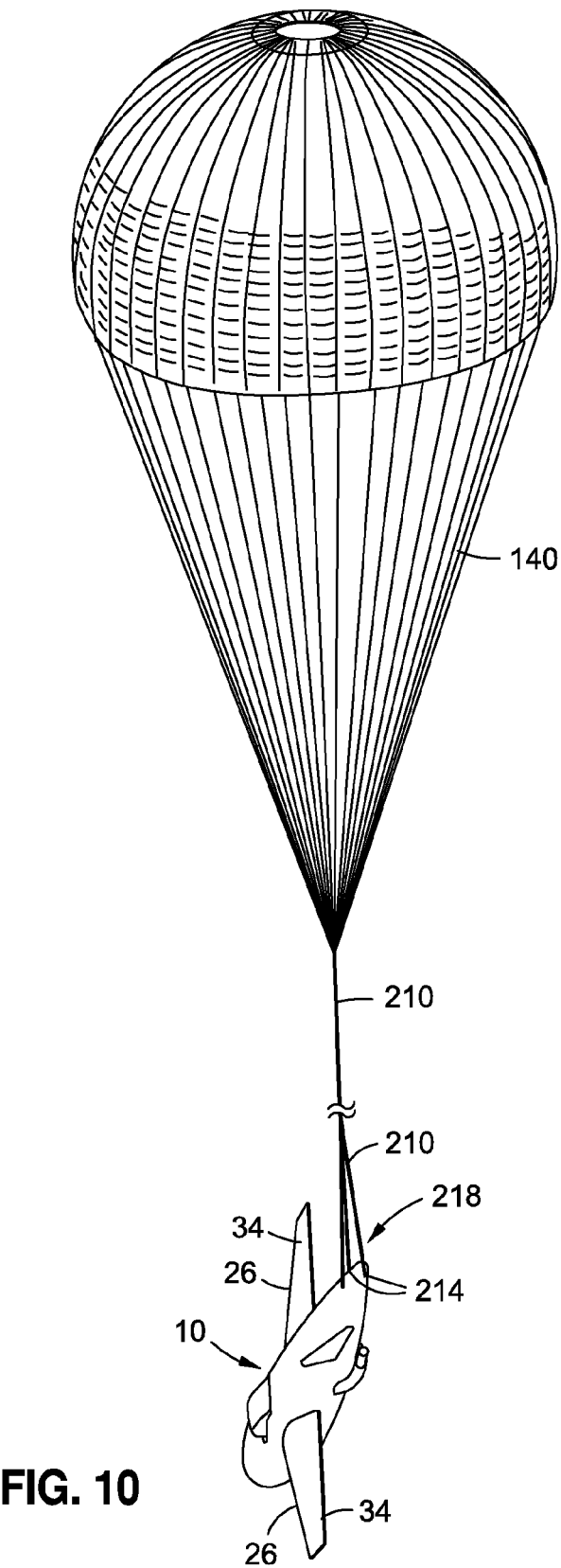
FIG. 10 is an illustration of the unmanned vehicle of FIG. 8 in a pull-up position.
Figure 11:
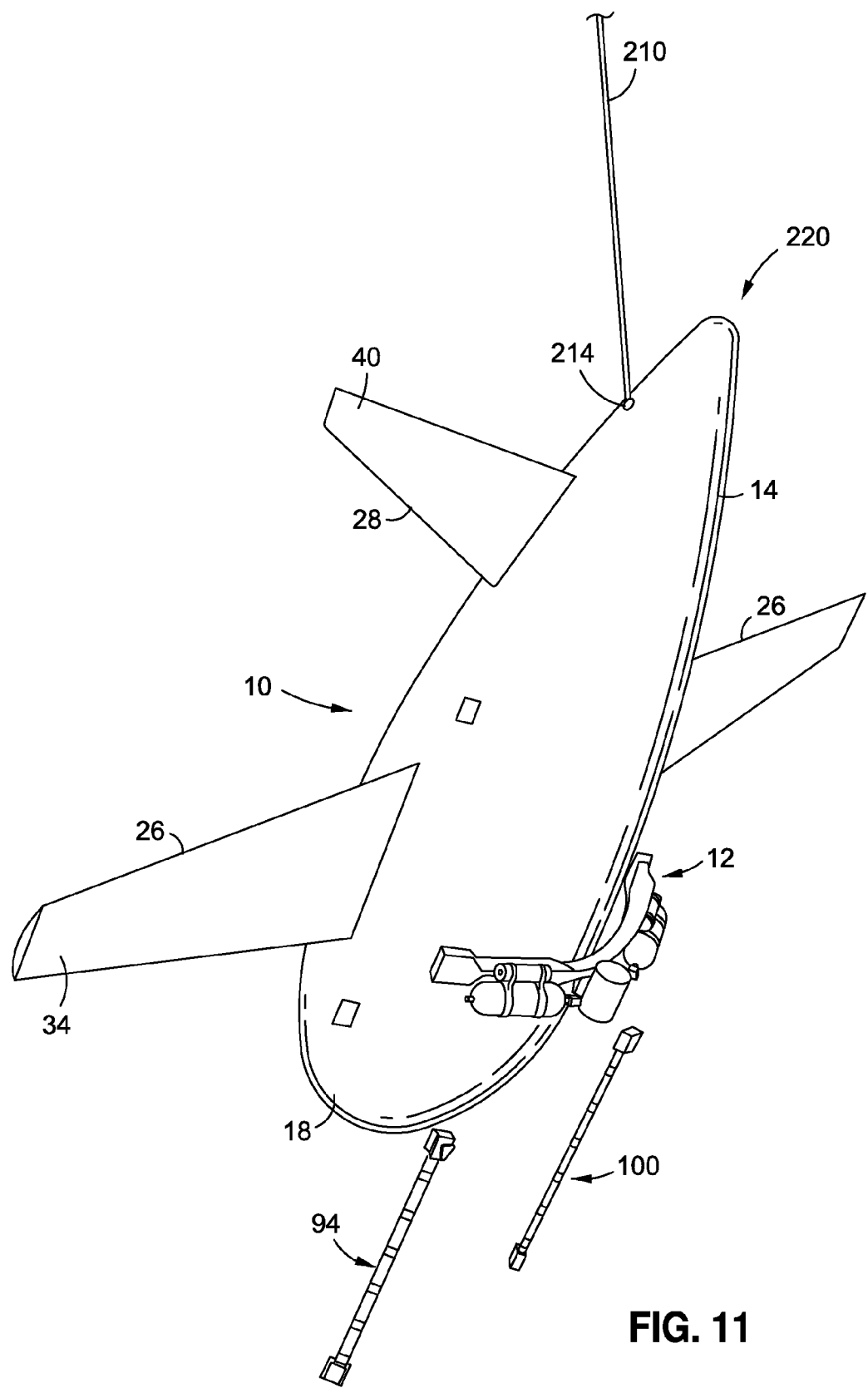
FIG. 11 is an illustration of the unmanned vehicle of FIG. 8 in a fully inflated position with deployment of the detachable inflation system and rails.

With reference to FIG. 1, an illustration of a bottom perspective view of an embodiment of an unmanned air vehicle 10 with an embodiment of a detachable inflation system 12 of the disclosure is shown. Although the unmanned air vehicle 10 is shown, manned or crewed air vehicles may also be used. FIG. 2 is an illustration of a bottom perspective view of the detachable inflation system 12 of FIG. 1. As shown in FIG. 1, the unmanned air vehicle 10 comprises a fuselage 14 having a top side 16, a bottom side 18, a first end 20, and a second end 22. The unmanned air vehicle 10 further comprises at least one inflatable structure 24. The inflatable structure 24 may comprise at least one inflatable wing 26, at least one inflatable tail 28 or empennage, and/or or other inflatable structures, such as one or more inflatable canards (not shown), inflatable fuselage sections (not shown), inflatable recovery systems (not shown), inflatable cavity fillers (not shown), and/or inflatable aero fairing doors (not shown). Aero fairing doors are aerodynamic fairings or coverings that smooth out any outer mold lines on the air vehicle and may cover exposed parts on the air vehicle. Preferably, the unmanned air vehicle 10 comprises two inflatable wings 26 and one inflatable tail 28 or empennage. FIG. 1 shows the inflatable wing 26 in a deflated position 30 on a portion 32 of the top side 16 of the unmanned air vehicle 10. FIGS. 10-11 show the inflatable wings 26 in an inflated position 34. FIG. 1 shows the inflatable tail 28 in a deflated position 36 on a portion 38 of the top side 16 of the unmanned air vehicle 10. FIG. 11 shows the inflatable tail 28 in an inflated position 40. In an exemplary embodiment, the inflatable wings 26 may be obtained from Vertigo Inc. of Lake Elsinore, Calif. The inflatable structures 24 may be constructed of a woven fabric, a film, or a coated woven fabric preferably having good strength, durability, storage life, thermal sensitivity, electrical properties, emissivity, and leak resistant. Preferably, the inflatable structures 24 may comprise a flexible composite consisting of a urethane gas bather wrapped with a high strength fiber braid in an adhesive matrix. Preferably, the inflatable structures 24 are designed to be filled with a high pressure compressed fluid or gas (discussed below). The inflatable structure 24 comprises an inflation distribution system 42 (see FIG. 12) for distributing one or more high pressure compressed fluids or gases 158, 182 (discussed below) into the inflatable structure 24. For example, the inflatable wing 26 comprises inflation distribution system 42 (see FIG. 12) for distributing one or more high pressure compressed fluids or gases, discussed below, into the inflatable wing 26 to inflate the inflatable wing 26.

The inflation distribution system 42 (see FIG. 12) comprises one or more inflation distribution lines 44 or tubing comprised of stainless steel, plastic, polyvinyl chloride, or another suitable material. The inflatable tail 28 may be connected to the inflation distribution system 42 which distributes the one or more high pressure compressed fluids or gases into the inflatable tail 28 to inflate the inflatable tail 28. The unmanned air vehicle 10 may further comprise a replenishment system 50 (see FIG. 12), discussed in detail below, positioned in the unmanned air vehicle 10 for distributing additional amounts of the one or more high pressure compressed fluids or gases into the inflatable wing 26 in the inflated position 34 and/or into the inflatable tail 28 in the inflated position 40 to replace lost differential pressure in the inflatable wing 26 and/or inflatable tail 28.

Figure 3:
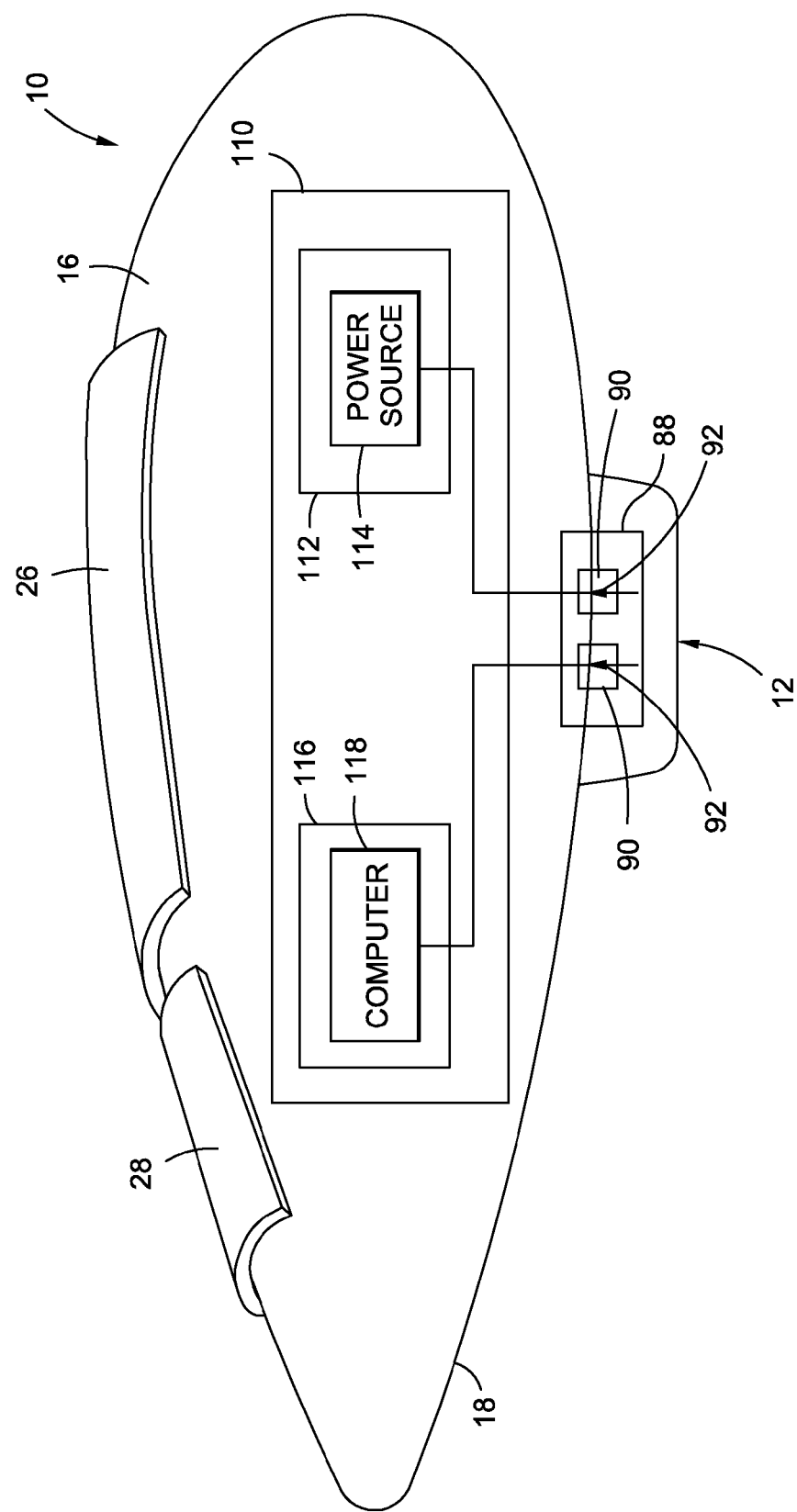
FIG. 3 is an illustration of a schematic view of a separation system and a control system used with an embodiment of a detachable inflation system of the disclosure.

As shown in FIG. 1, the detachable inflation system 12 may be detachably positioned on an external surface 74 of the bottom side 18 of the fuselage 14. The detachable inflation system 12 may also be detachably positioned to other suitable external surfaces on the fuselage 14. The detachable inflation system 12 may comprise in a preferred embodiment a parachute attached pallet 76. In an exemplary embodiment, the detachable inflation system 12 comprises a pallet structure 78 having a top side 80, a bottom side 82, a first end 84, and a second end 86. The detachable inflation system 12 may be detachably positioned on the fuselage 14 via a separation system 88. As shown in FIG. 3, the separation system 88 may comprise one or more interface attachments 90 that interface at various locations between the top side 80 of the pallet structure 78 and the bottom side 18 of the fuselage 14 of the unmanned air vehicle 10. The interface attachments 90 are preferably releasable in order to enable deployment or discarding of the detachable inflation system 12 from the unmanned air vehicle 10 after the inflatable structures 24 of the unmanned air vehicle 10 are inflated. The interface attachments 90 may comprise one or more of, or combinations of, explosive bolts 92, latch mechanisms that may be actuated by electro-mechanical devices (not shown), hydro-mechanical devices (not shown), pins (not shown), hooks (not shown), pneumatic devices (not shown) or other suitable interface attachments. As further shown in FIG. 3, the detachable inflation system 12 may further comprise a control system 110 located in the unmanned air vehicle 10. The control system 110 may comprise an electrical control subsystem 112 for providing electrical power to the detachable inflation system 12 via a power source 114, such as a battery or other suitable power source. For example, the electrical control subsystem 112 may provide power to the interface attachments 90, such as the electro-mechanical latches (not shown) for releasing the detachable inflation system 12 from the unmanned air vehicle 10. The control system 110 may further comprise a computer control subsystem 116 for providing commands and/or sequences to the detachable inflation system 12 via a computer 118 that may be located in the unmanned air vehicle 10. For example, the computer control subsystem 116 may provide commands and/or sequences to the detachable inflation system 12 to activate a main parachute canister 122 (see FIG. 2), a first latch valve 168 (see FIG. 2), a gas generator 184 (see FIG. 2), or other components of the detachable inflation system 12.

Figure 4:
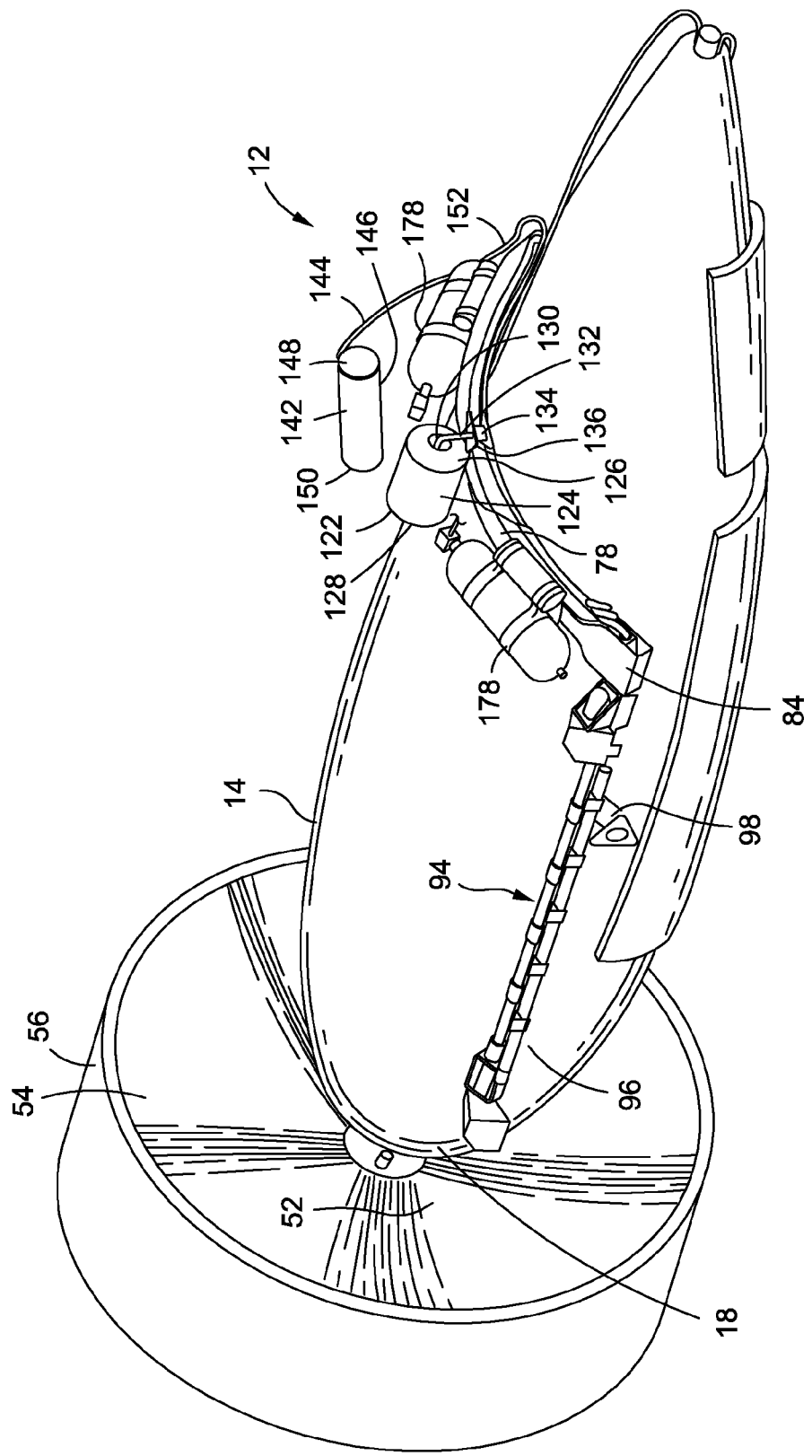
FIG. 4 is an illustration of a bottom perspective view of an embodiment of an unmanned air vehicle in a stowed position with an embodiment of a detachable inflation system of the disclosure.
Figure 5:
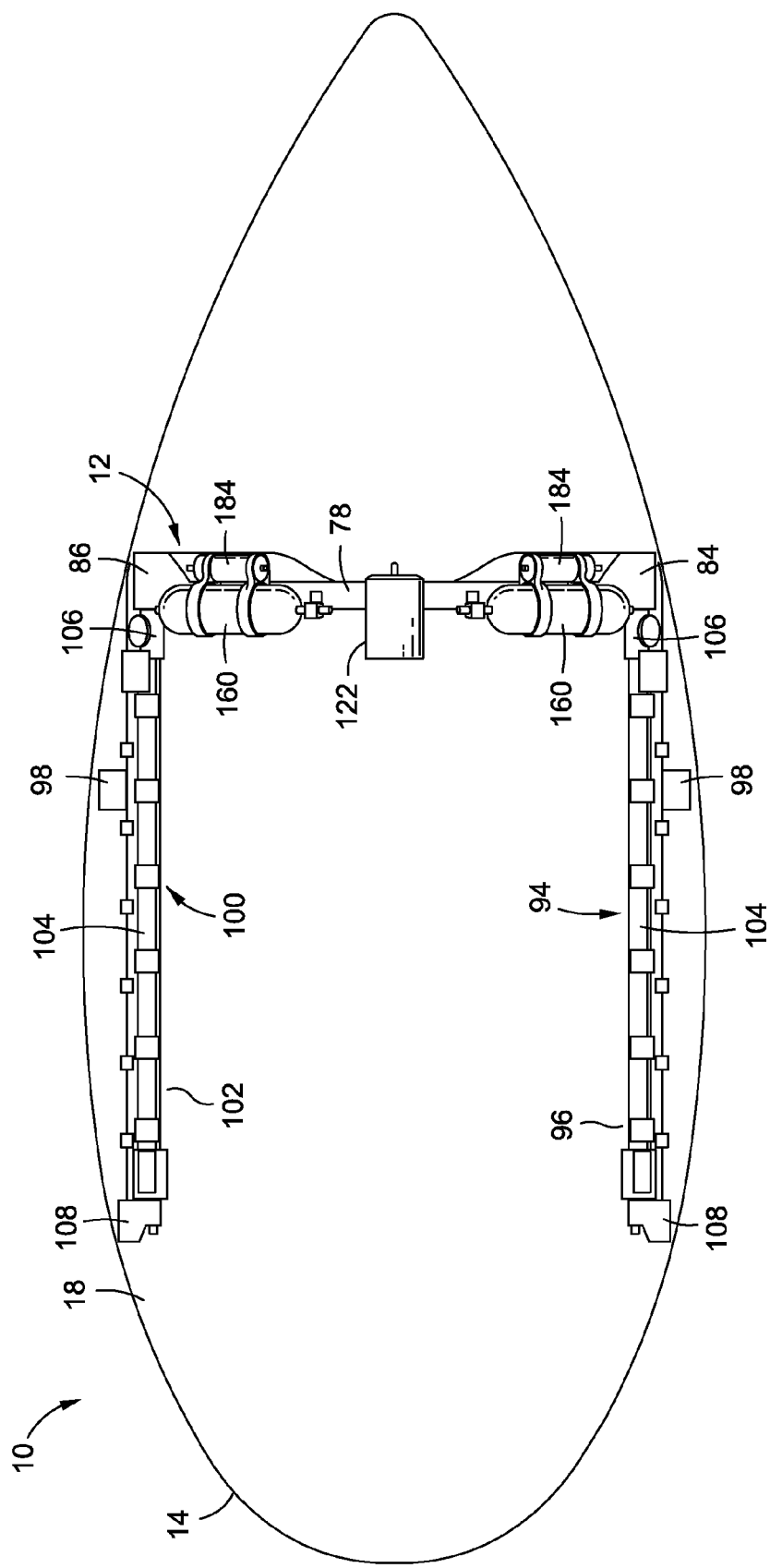
FIG. 5 is an illustration of a bottom perspective view of the detachable inflation system and rails of FIG. 4.

FIG. 4 is an illustration of a bottom perspective view of an embodiment of the unmanned air vehicle 10 in a stowed position 52 (see also FIG. 7) with an embodiment of the detachable inflation system 12. The unmanned air vehicle 10 is attached to a fixed heat shield 54. The fixed heat shield 54 is attached to a launch vehicle interface structure 56. FIG. 4 shows a first rail device 94 attached to a portion 96 of the bottom side 18 of the fuselage 14 of the unmanned air vehicle 10 via an attachment element 98. FIG. 5 is an illustration of a bottom perspective view of the detachable inflation system 12 of FIG. 4. FIG. 5 shows the first rail device 94 and a second rail device 100 which may be opposite the first rail device 94. The second rail device 100 is attached to a portion 102 of the bottom side 18 of the fuselage 14 of the unmanned air vehicle 10 via an attachment element (not shown) which is opposite to and identical to the attachment element 98. Each rail device 94, 100 has an elongated body portion 104, a first end 106, and a second end 108. The first end 106 of the first rail device 94 is attached to the first end 84 of the pallet structure 78. The first end 106 of the second rail device 100 is attached to the second end 86 of the pallet structure 78. The first and second rail devices 94, 100 are optional and may be used to facilitate sliding the unmanned air vehicle 10 out of a space vehicle 66 (see FIG. 7). The first and second rail devices 94, 100 are deployed or discarded from the unmanned air vehicle 10 along with the detachable inflation system 12 after the inflatable wing or wings 26 and the inflatable tail 28 are inflated.

As shown in FIGS. 1-2 and 4, the detachable inflation system 12 in the preferred embodiment of the parachute attached pallet 76 further comprises the main parachute canister 122. The main parachute canister 122 may comprise a cylindrical body 124, a first end 126, and a second end 128. As shown in FIG. 4, the first end 126 may have an opening 130 for insertion of an attachment means 132 that may be used to attach the main parachute canister 122 to a clip device 134 on a portion 136 of the pallet structure 78. The attachment means 132 may comprise a rope 138. Other suitable attachment means (not shown) may include cables, bolts, screws, bonds, or other types of attachment means. The main parachute canister 122 may be comprised of metal, composite materials such as fiberglass or carbon fiber, or another suitable material. A detachable parachute 140 (see FIG. 8) may be stored within the main parachute canister 122 prior to deployment of the detachable parachute 140. The detachable parachute 140 may be comprised of ripstop nylon or other suitable lightweight, high strength, storable fabric material. If the detachable parachute 140 requires assistance in being pulled out of the main parachute canister 122 and assistance in properly inflating, one or more optional smaller pilot parachute canisters 142 (see FIG. 4) may be used. FIG. 4 shows a pilot parachute canister 142 that may contain or store a pilot parachute (not shown). The pilot parachute canister 142 may be welded, bolted, or bonded to the interior of the space vehicle (not shown in FIG. 4). The pilot parachute canister 142 may comprise a cylindrical body 146, a first end 148, and a second end 150. Parachute riser 144 may attach the pilot parachute (not shown) in the pilot parachute canister 142 to the detachable parachute 140 in the main parachute canister 122. The first end 148 may be attached to the parachute riser 144. The parachute riser 144 may comprise a rope 152, a cable (not shown), ribbon (not shown), or another suitable attachment means. The pilot parachute canister 142 may be comprised of metal, composite materials such as fiberglass or carbon fiber, or another suitable material. The pilot parachute (not shown) is typically smaller than the detachable parachute 140 and may be deployed by a mortar (not shown) within the pilot parachute canister 142. When the pilot parachute inflates, it extracts or pulls out the detachable parachute 140 from the main parachute canister 122. Thus, the optional pilot parachute may be used to facilitate the extraction of the main parachute. In addition, one or more progressively smaller pilot parachutes (not shown) may be used to facilitate extraction of the pilot parachute, which in turn, facilitates extraction of the main parachute. The detachable inflation system 12 may comprise a one-parachute, two-parachute, three-parachute, or more than three-parachute system for use with the unmanned air vehicle 10.

Figure 6:
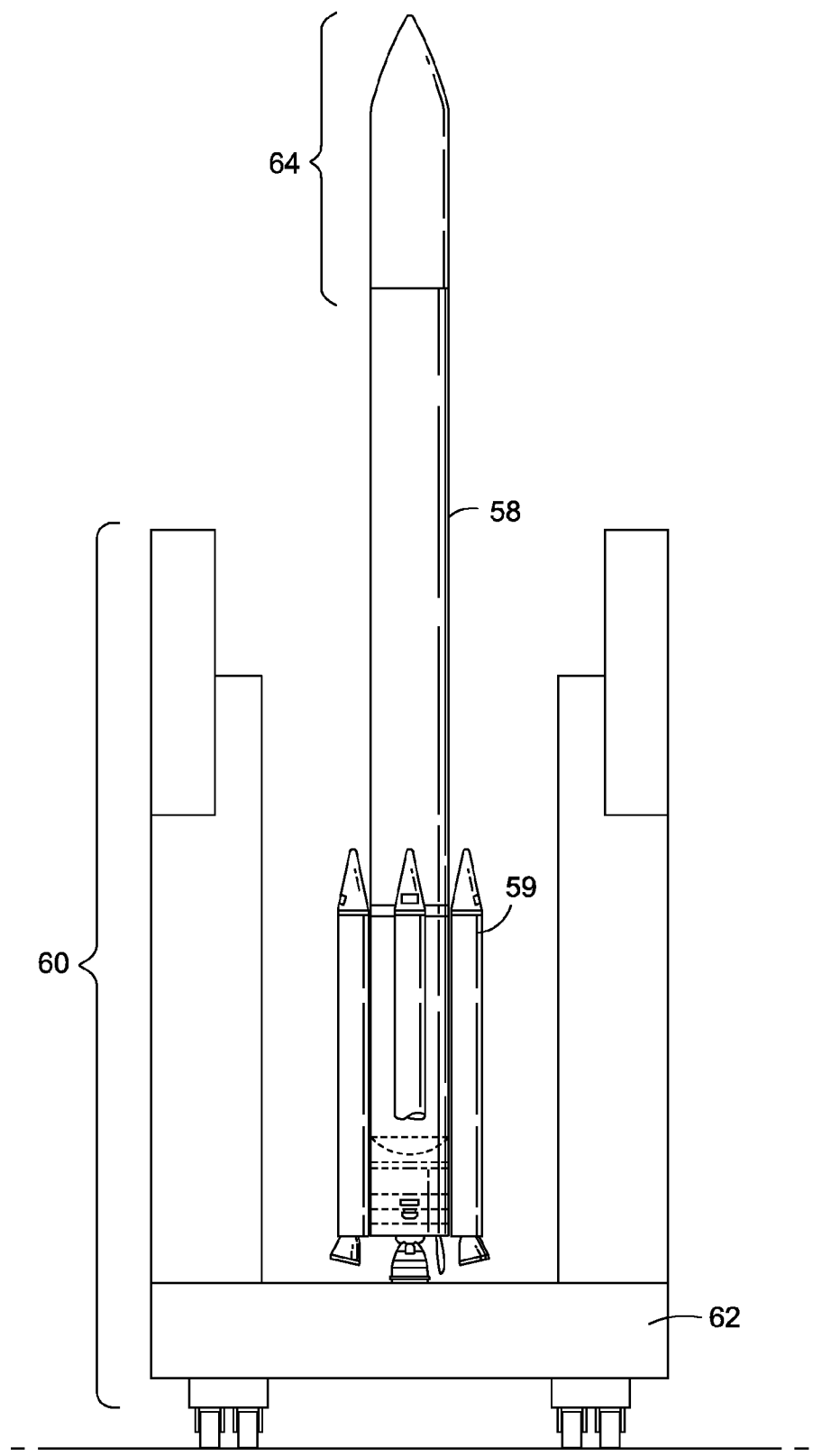
FIG. 6 is an illustration of a front perspective view of an embodiment of a launch vehicle, a launching apparatus, and a launch vehicle payload fairing.

FIG. 6 is an illustration of a front perspective view of an embodiment of a launch vehicle 58, a launching apparatus 60, and a launch vehicle payload fairing 64. As shown in FIG. 6, the unmanned air vehicle 10 may be launched into space via a launch vehicle 58 from a launching apparatus 60 on the ground. The launch vehicle 58 may comprise a missile, a gun launch vehicle, a rocket, an aircraft, or another suitable vehicle. FIG. 6 shows the launch vehicle 58 with rocket boosters 59. The launch apparatus 60 may comprise a launching pad 62, servicing equipment (not shown), and other suitable components. The unmanned air vehicle 10 may be housed within a launch vehicle payload fairing 64. The launch vehicle payload fairing 64 protects the unmanned air vehicle 10 during ascent against the impact of the atmosphere, such as without limitation, aerodynamic pressure and aerodynamic heating. Once in space or substantially outside the atmosphere, the launch vehicle payload fairing 64 may be jettisoned, exposing the unmanned air vehicle 10.

Figure 7:
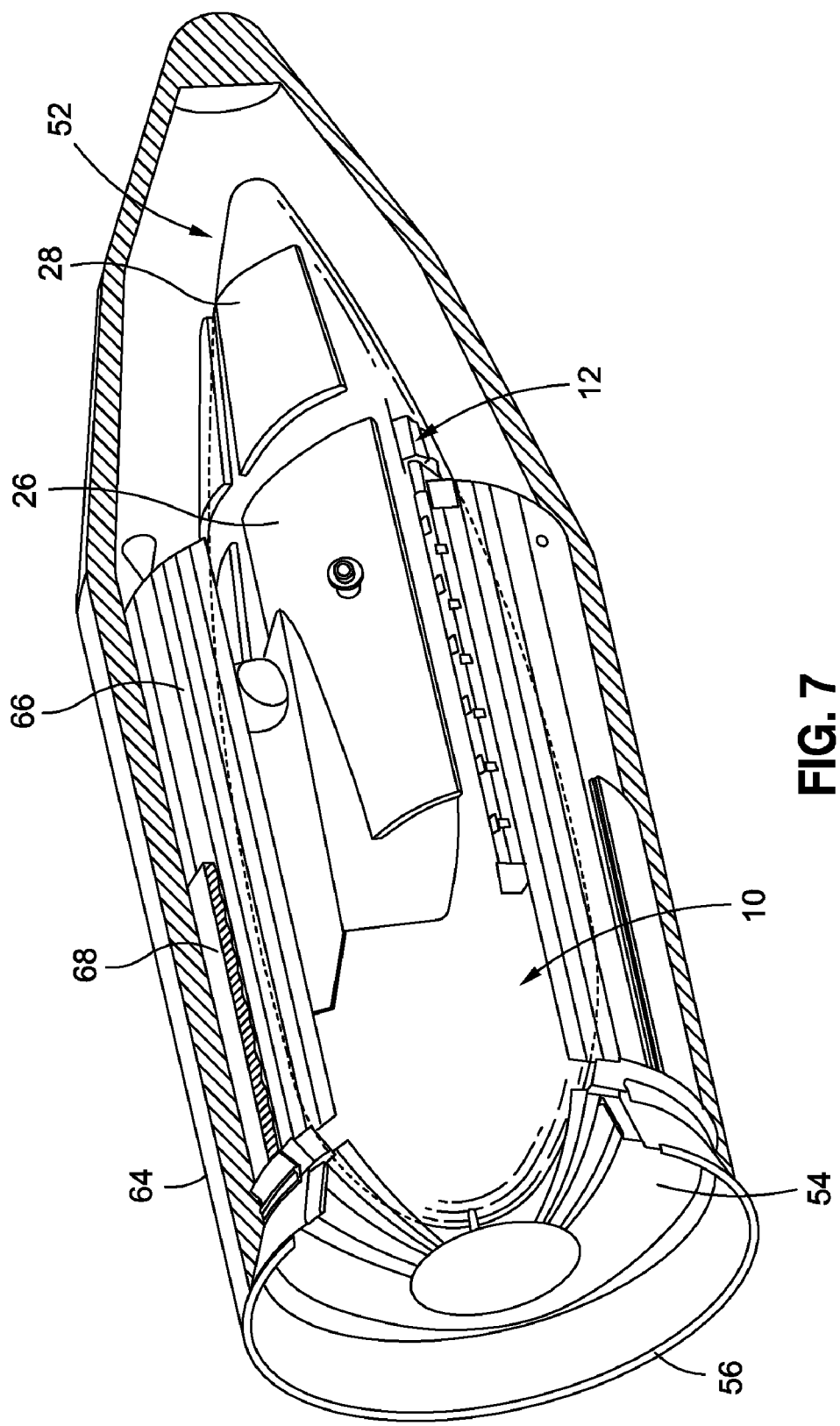
FIG. 7 is an illustration of a side perspective view of an embodiment of an unmanned air vehicle within a launch vehicle payload fairing.

FIG. 7 is an illustration of a side perspective view of an embodiment of the unmanned air vehicle 10 attached to the space vehicle 66 housed within the launch vehicle payload fairing 64. The launch vehicle interface structure 56 interfaces between the launch vehicle payload fairing 64 and the launch vehicle 58. The space vehicle 66 may include an inflatable aerodynamic decelerator (IAD) 68 that protects the space vehicle 66 and the unmanned air vehicle 10 against re-entry temperatures when the space vehicle 66 and the unmanned air vehicle 10 re-enter a planet's atmosphere from space, such as planet Earth. The unmanned air vehicle 10 may be detached or separated from the space vehicle 66 after the space vehicle 66 re-enters the planet's atmosphere. As the unmanned air vehicle 10 descends through the planet's atmosphere, the detachable inflation system 12 may be detached or separated from the unmanned air vehicle 10 after the inflatable wing 26 is inflated, and if there is an inflatable tail, after the inflatable tail 28 is also inflated.

Referring to FIGS. 1-3 and 12, the detachable inflation system 12 further comprises an initial inflation system 154 (see FIG. 12) that provides and distributes one or more compressed fluids, discussed below, into the inflatable structure 24 of the unmanned air vehicle 10. Preferably, the initial inflation system 154 stores and generates the one or more compressed fluids, discussed below, into the inflatable structures 24 of the unmanned air vehicle 10. The initial inflation system 154 may comprise one or more storage devices 156 positioned on the detachable inflation system 12 that stores a first compressed fluid 158 (see FIG. 12). The first compressed fluid 158 may comprise a high pressure gas or liquid such as nitrogen, helium, compressed air, ammonia, a mixture thereof, or another suitable high pressure gas or liquid. As shown in FIGS. 1-3 and 12, the storage device 156 preferably comprises a pressurized container 160. The pressurized container 160 may be made of carbon fiber over titanium, fiberglass over aluminum, titanium, aluminum, stainless steel, or another suitable material. The storage device 156, such as the exemplary pressurized container 160, may comprise a body 162 having a cylindrical or spherical shape, a first end 164, and a second end 166. The first end 164 may be coupled to a first latch valve 168 that controls the flow of the first compressed fluid 158 out of the storage device 156. The first latch valve 168 may be coupled to a first pressure line 170 which may, in turn, be coupled to a first pressure line disconnect 172 (see FIG. 12). The first pressure line disconnect 172 may be positioned at an interface 174 between the detachable inflation system 12 and the unmanned air vehicle 10 (see FIG. 12). As shown in FIG. 1, the pressurized containers 160 may be attached to the pallet structure 78 with one or more attachment fittings 176. The attachment fittings 176 may comprise straps 178 made of a rigid material such as aluminum, steel, composites, or another suitable material.

The initial inflation system 154 of the detachable inflation system 12 may further comprise one or more generator devices 180 positioned on the detachable inflation system 12 for generating a second compressed fluid 182 (see FIG. 12) through a chemical reaction. The second compressed fluid 182 may comprise the gaseous combustion products of an exothermic reaction from a combusted propellant (not shown), such gaseous combustion products comprising carbon dioxide gas, carbon monoxide gas, hydrogen gas, nitrogen gas, helium gas, oxygen, a mixture thereof, or another suitable gas. As shown in FIGS. 1-3 and 12, the generator device 180 preferably comprises a gas generator 184. For example, the gas generator 184 may comprise a small, solid rocket motor (not shown) that can burn a solid propellant (not shown). When the solid propellant is combusted, it decomposes into gaseous combustion products such as carbon dioxide gas, carbon monoxide gas, hydrogen gas, nitrogen gas, helium gas, oxygen, a mixture thereof, or another suitable combustion product, to make the second compressed fluid 182. The gas generator 184 may be made of steel, aluminum, titanium, carbon fiber composite, or another suitable material. The generator device 180, such as the exemplary gas generator 184, may comprise a cylindrical body 186, a first end 188, and a second end 190. The first end 188 may be coupled to a check valve 192 (see FIG. 12) that controls the flow of the high pressure gas 182 out of the generator device 180. The check valve 192 may be coupled to a second pressure line 194, which may, in turn, be coupled to a second pressure line disconnect 196 (see FIG. 12). The second pressure line disconnect 196 may be positioned at an interface 198 between the detachable inflation system 12 and the unmanned air vehicle 10. As shown in FIG. 1, the gas generator 184 may be attached to the pallet structure 78 with one or more attachment fittings 176. The attachment fittings 176 may comprise straps 178 of a rigid material such as aluminum, steel, composites, or another suitable material. In addition, the generator device 180 may be coupled to the storage device 156 with the attachment fittings 176.

Figure 8:
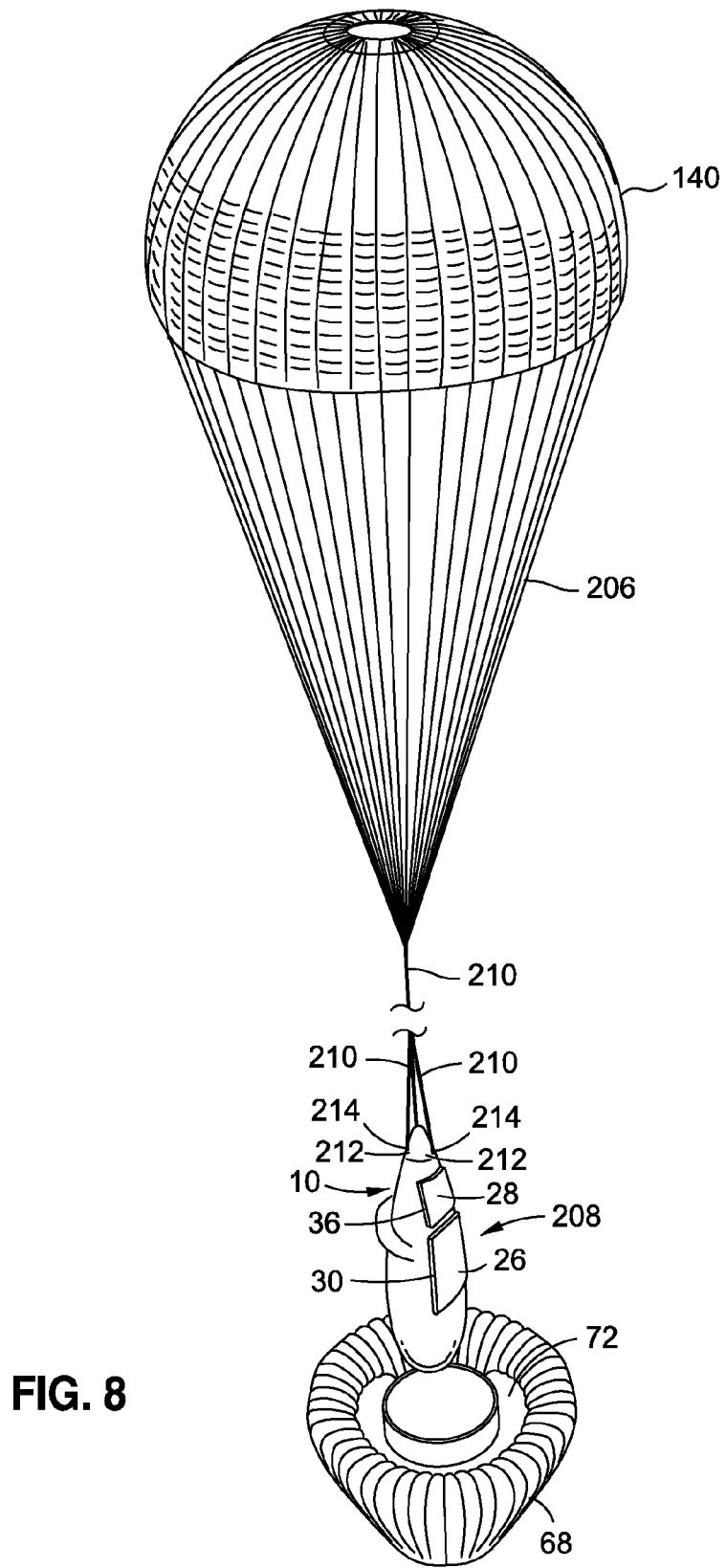
FIG. 8 is an illustration of a front perspective view of an embodiment of an unmanned air vehicle in an initial separation position.

FIG. 8 is an illustration of a front perspective view of an embodiment of an unmanned air vehicle 10 in an initial separation position 208. The detachable parachute 140 is in a deployed position 206, and the unmanned air vehicle 10 is initially separating from the inflatable aerodynamic accelerator 68 which is in a partially inflated position 72. Upon re-entry into the planet's atmosphere from space, the computer control subsystem 116 (see FIG. 3) in the unmanned air vehicle 10 can send one or more commands to the detachable inflation system 12 to deploy the detachable parachute 140 from the main parachute canister 122. At this stage, the inflatable wing 26 is in the deflated position 30, and the inflatable tail 28 is in the deflated position 36. A main parachute cord 210 from the detachable parachute 140 may preferably be attached at multiple attachment points 214 on the portions 212 of the fuselage 14 of the unmanned air vehicle 10 for stability.

Figure 9:
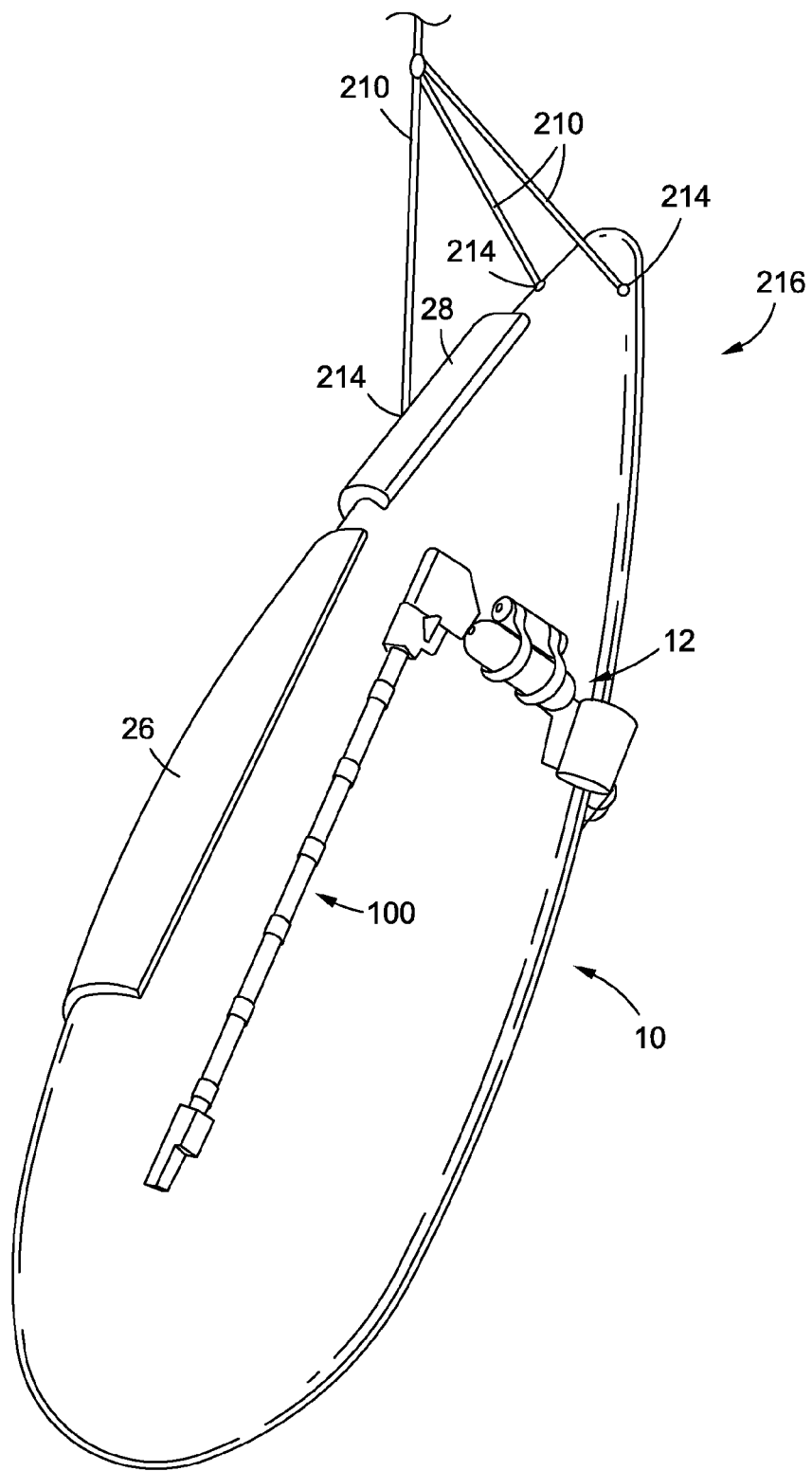
FIG. 9 is an illustration of the unmanned air vehicle of FIG. 8 in a full separation position.

FIG. 9 is an illustration of the unmanned air vehicle 10 of FIG. 8 in a full separation position 216 where the unmanned air vehicle 10 is fully separated from the inflatable aerodynamic accelerator 68 (see FIG. 8). The main parachute cord 210 may still be attached for stability at multiple attachment points 214 to the unmanned air vehicle 10. The detachable parachute 140 pulls the unmanned air vehicle 10 up and away from the inflatable aerodynamic accelerator 68.

FIG. 10 is an illustration of the unmanned vehicle of FIG. 8 in a pull-up position 218. The main parachute cord 210 may still be attached at multiple attachment points 214 to the unmanned air vehicle 10, and the inflatable wings 26 are now in the inflated position 34. The detachable parachute 140 extracts and slows the unmanned air vehicle 10. The unmanned air vehicle 10 may begin to pull up to arrest its descent and assume level flight. The detachable parachute 140 is retained in a pull-up position 218 for drag. This prevents the unmanned air vehicle 10 from over speeding as the inflatable wings 26 are inflated and the engine (not shown) is started.

FIG. 11 is an illustration of the unmanned vehicle 10 of FIG. 8 in a fully inflated position 220 with deployment of the detachable inflation system 12 and rails 94, 100. FIG. 11 shows the detachable parachute 140 still attached to the unmanned air vehicle 10 via the main parachute cord 210 at attachment point 214, the inflatable wings 26 in the inflated position 34, and the inflatable tail 28 now in the inflated position 40. As the unmanned air vehicle 10 descends, its inflatable wings 26 inflate, and it pulls up to horizontal flight, the multiple attachment points 214 may be changed to a single attachment point to better facilitate the pull-up maneuver. As the unmanned air vehicle 10 continues to pull up, the flight speed will decrease until it approaches a minimum and the detachable parachute 140 is discarded. Once the detachable parachute 140 is discarded, the flight speed will increase until the pull up is complete and the unmanned air vehicle 10 has reached its design cruise speed. With the inflatable wing 26 and the inflatable tail 28 both inflated, the detachable inflation system 12 and the first and second rail devices 94, 100 are discarded from the bottom side 18 of the fuselage 14 of the unmanned air vehicle 10 in order to decrease the weight of the unmanned air vehicle 10 and reduce drag and radar cross section (RCS). The replenishment system 50 (see FIG. 12) may add high pressure gas to the inflatable wings 26 and the inflatable tail 28 if they leak during descent of the unmanned air vehicle 10.

Figure 12:
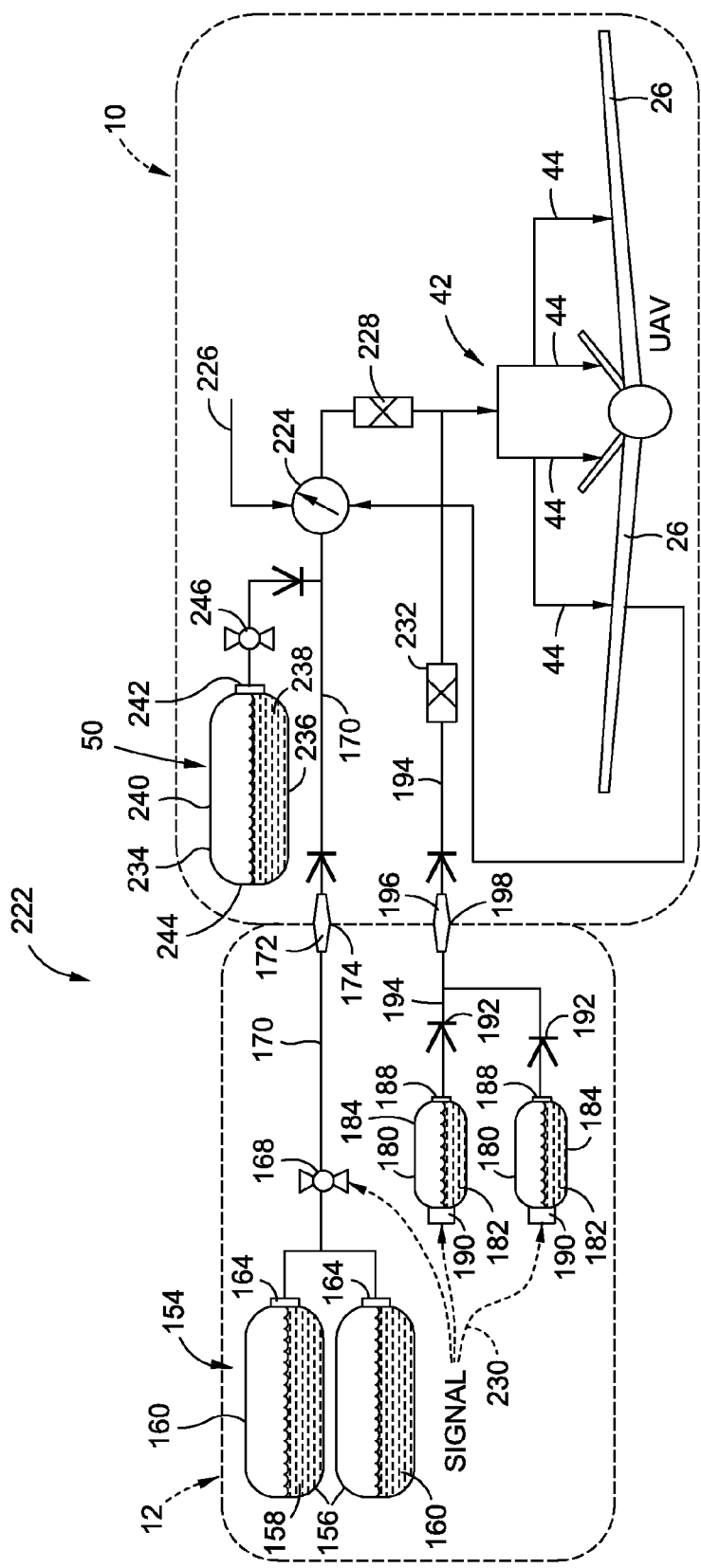
FIG. 12 is a schematic illustration of an embodiment of an inflation system for an air vehicle including an embodiment of a detachable inflation system of the disclosure.

FIG. 12 is a schematic illustration of an embodiment of an inflation system 222 for an embodiment of the unmanned air vehicle 10 including an embodiment of the detachable inflation system 12 of the disclosure. The inflation system 222 comprises the initial inflation system 154 of the detachable inflation system 12 that provides, and preferably stores and generates, and distributes one or more compressed fluids 158, 182 into the inflatable structures 24 of the unmanned air vehicle 10. As discussed above, the initial inflation system 154 comprises one or more storage devices 156, preferably in the form of pressurized containers 160 that stores the first compressed fluid 158 which may be used to initially inflate the inflatable structures 24 of the unmanned air vehicle 10. Each pressurized container 160 is coupled to the first latch valve 168 that controls the flow of the first compressed fluid 158 out of the pressurized container 160. The first latch valve 168 may be coupled to the first pressure line 170 which may, in turn, be coupled to the first pressure line disconnect 172. The first pressure line disconnect 172 may be positioned at the interface 174 between the detachable inflation system 12 and the unmanned air vehicle 10. The first compressed fluid 158 from the pressurized containers 160 can flow through the first pressure lines 170 in the detachable inflation system 12, past the first pressure line disconnect 172 at the interface 174 of the detachable inflation system 12 and the unmanned air vehicle 10 and into the first pressure lines 170 in the unmanned air vehicle 10. The pressure of the first compressed fluid 158 flowing through the first pressure lines 170 in the unmanned air vehicle 10 may be regulated with a pressure controlled valve 224 which measures a picot static pressure 226. The flow of the first compressed fluid 158 flowing through the pressure controlled valve 224 through the first pressure lines 170 of the unmanned air vehicle 10 may be restricted with a first flow restrictor 228. The first flow restrictor 228 may restrict flow of the first compressed fluid 158 from the first pressure lines 170 of the unmanned air vehicle 10 into the set of inflation distribution lines 44 that carry the first compressed fluid 158 into the inflatable structures 24, such as the inflatable wing or wings 26 and into the inflatable tail 28 of the unmanned air vehicle 10.

As discussed above and as shown in FIG. 12, the initial inflation system 154 of the detachable inflation system 12 may further comprise one or more generator devices 180, preferably in the form of the gas generators 184 for generating the second compressed fluid 182 which may be used to initially inflate the inflatable structures 24 of the unmanned air vehicle 10. Each gas generator 184 has the second end 190 for receiving a signal 230 from computer control system 116 (see FIG. 3). Each gas generator 184 may be coupled at the first end 188 to the check valve 192 that controls the flow of the second compressed fluid 182 out of the gas generator 184. The check valves 192 may be coupled to the second pressure line 194, which may, in turn, be coupled to the second pressure line disconnect 196. The second pressure line disconnect 196 may be positioned at the interface 198 between the detachable inflation system 12 and the unmanned air vehicle 10. The second compressed fluid 182 from the gas generators 184 may flow through the second pressure lines 194 in the detachable inflation system 12, past the second pressure line disconnect 196 at the interface 198 of the detachable inflation system 12 and the unmanned air vehicle 10 and into the second pressure line 194 in the unmanned air vehicle 10. The flow of the second compressed fluid 182 flowing through the second pressure line 194 in the unmanned air vehicle 10 may be restricted with a second flow restrictor 232. The second flow restrictor 232 may restrict flow of the second compressed fluid 182 from the second pressure line 194 of the unmanned air vehicle 10 into the set of inflation distribution lines 44 that carry the second compressed fluid 182 into the inflatable structures 24, such as the inflatable wing or wings 26 and into the inflatable tail 28 of the unmanned air vehicle 10. The inflation system 222 thus comprises the first pressure line 170 and the second pressure line 194 that are positioned and run through the detachable inflation system 12 and that connect via the first and second pressure line disconnects 172, 196 to the first pressure line 170 and second pressure line 194 that are positioned and run through the unmanned air vehicle 10.

Upon descent or level flight of the unmanned air vehicle 10, the first and/or second compressed fluids 158, 182 (high pressure gases) may leak out of the inflatable wings 26 and/or the inflatable tail 28. As the gauge pressure in the inflatable wings 26 and inflatable tail 28 decreases, either through gas leakage out of the inflatable wings 26 and inflatable tail 28, or ambient pressure increase due to a descent, the pressure controlled valve 224 or pressure regulator will regulate re-inflation of the inflatable wings 26 and inflatable tail 26 to maintain the gauge pressure.

To replenish the compressed fluids that may leak out of the inflatable wings 26 and/or the inflatable tail 28, the inflation system 222 may further comprise the replenishment system 50 positioned in the unmanned air vehicle 10. The replenishment system 50 may comprise one or more replenishment devices 234, preferably in the form of a pressurized replenishment container 236, for distributing a compressed replenishment fluid 238 into the already inflated inflatable wing or wings 26 and/or already inflated inflatable tail 28 of the unmanned air vehicle 10, to compensate for leaks, diurnal thermal cycles, and/or descent of the unmanned air vehicle 10. The compressed replenishment fluid may comprise gaseous or liquid nitrogen, gaseous or liquid helium, compressed air, or another suitable compressed replenishment fluid. The pressurized replenishment container 236 may be made of carbon fiber over titanium, fiberglass over aluminum, or another suitable material. The replenishment device 234, such as the exemplary pressurized replenishment container 236, may comprise a cylindrical body 240, a first end 242, and a second end 244. The first end 242 may be coupled to a second latch valve 246 for controlling the flow of the compressed replenishment fluid 238 from the replenishment device 234 to the first pressure line 170 of the unmanned air vehicle 10. The pressure of the compressed replenishment fluid 238 flowing through the first pressure line 170 of the unmanned air vehicle 10 may be regulated with the pressure controlled valve 224. The flow of the compressed replenishment fluid 238 flowing from the pressure controlled valve 224 through the first pressure line 170 of the unmanned air vehicle 10 may be restricted with the first flow restrictor 228. The first flow restrictor 228 may restrict flow of the compressed replenishment fluid 238 through the first pressure line 170 of the unmanned air vehicle 10 and into the set of inflation distribution lines 44 that carry the compressed replenishment fluid 238 into the inflatable wings 26 and into the inflatable tail 28 of the unmanned air vehicle 10.

Figure 13:
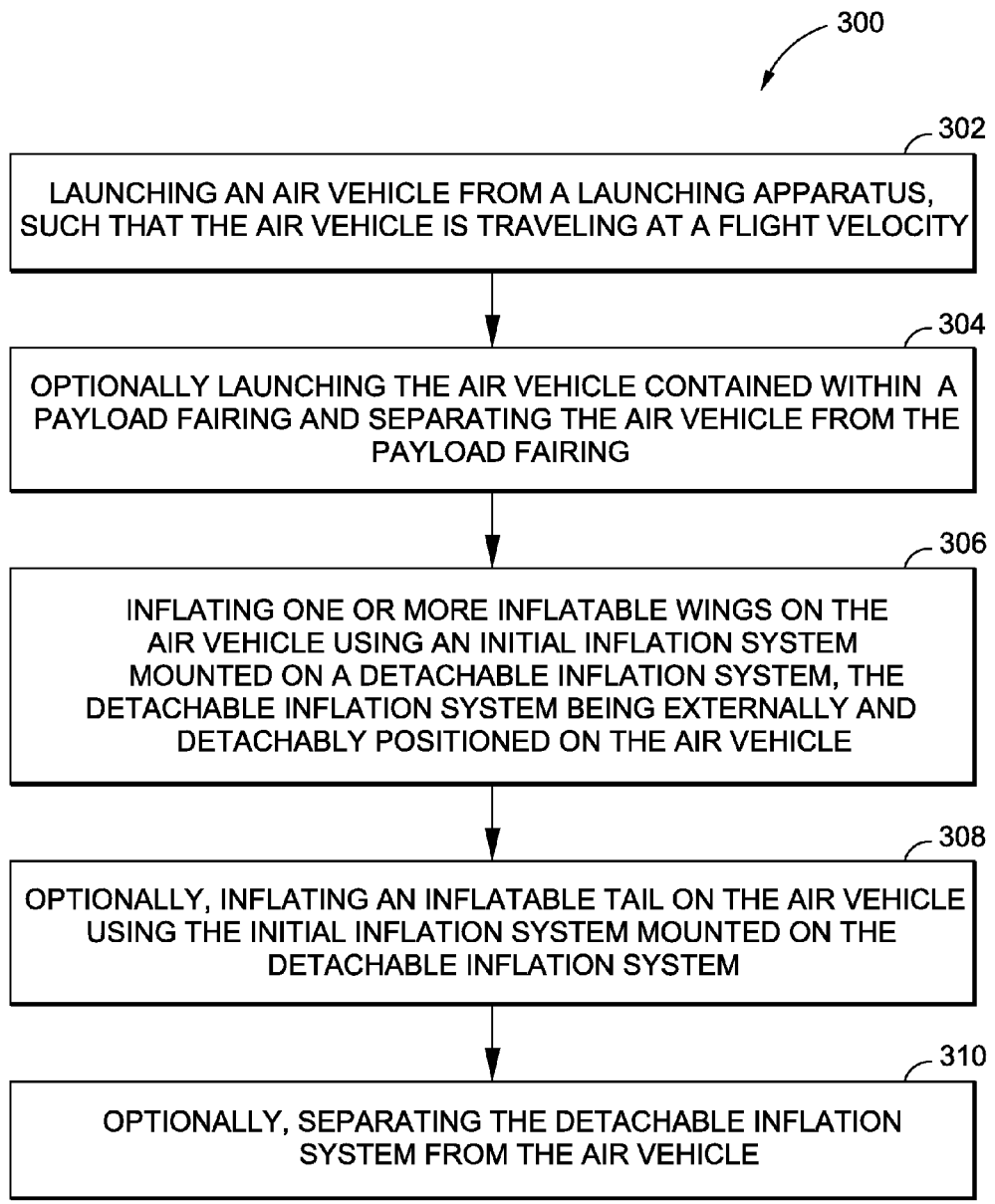
FIG. 13 is an illustration of a flow diagram of the steps of an embodiment of a method of operating an air vehicle of the disclosure.

In another embodiment of the disclosure, there is provided a method 300 of operating the unmanned air vehicle 10 with the detachable inflation system 12 of the disclosure. FIG. 13 is an illustration of a flow diagram of the steps of an embodiment of the method 300 of operating the unmanned air vehicle 10 with the detachable inflation system 12 of the disclosure. Preferably, the detachable inflation system 12 is in the form of a parachute attached pallet 76, as discussed above and shown in FIGS. 1-4. The method 300 comprises step 302 of launching an air vehicle, such as an unmanned air vehicle 10, from a launching apparatus 60 (see FIG. 6), such that the unmanned air vehicle 10 is traveling at a flight velocity. Optionally, the method 300 may further comprise step 304 of launching the unmanned air vehicle 10 contained within a launch vehicle payload fairing 64 and separating the unmanned air vehicle 10 from the launch vehicle payload fairing 64. The method 300 further comprises step 306 of inflating one or more inflatable wings 26 on the unmanned air vehicle 10 using an initial inflation system 154 mounted on the detachable inflation system 12. The detachable inflation system 12 is preferably externally and detachably positioned on the unmanned air vehicle 10. The initial inflation system 154 may further comprise one or more compressed fluids 158, 182 (see FIG. 12) that can be detachably and fluidly connected to the unmanned air vehicle 10. Optionally, the method 300 may further comprise step 308 of inflating an inflatable tail 28 on the unmanned air vehicle 10 using the initial inflation system 154 mounted on the detachable inflation system 12. The method 300 may further comprise step 310 of separating the detachable inflation system 12 from the unmanned air vehicle 10 and either discarding the detachable inflation system 12 or deploying the detachable inflation system 12 and recovering it for re-use on another air vehicle.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An air vehicle comprising:
   a fuselage;
   at least one inflatable structure, the inflatable structure being inflatable and having an inflation distribution system for distributing one or more compressed fluids into the inflatable structure to inflate the inflatable structure;
   a detachable inflation system, detachably positioned on an external surface of the fuselage, the detachable inflation system comprising an initial inflation system that provides the one or more compressed fluids and distributes the one or more compressed fluids to the inflation distribution system;
   a separation system for separating the detachable inflation system from the air vehicle, the separation system comprising one or more releasable interface attachments between the detachable inflation system and the air vehicle; and,
   a replenishment system positioned in the air vehicle for distributing an additional amount of one or more compressed fluids into the at least one inflatable structure to replace a lost differential pressure.

2. The air vehicle of claim 1, wherein the detachable inflation system further comprises a pallet structure and a detachable parachute positioned on the pallet structure.

3. The air vehicle of claim 1, wherein the inflatable structure is selected from the group comprising one or more wings, a tail, one or more canards, one or more fuselage sections, one or more aero fairing doors, one or more recovery systems, and one or more cavity fillers.

4. The air vehicle of claim 1 further comprising a control system located in the air vehicle, the control system comprising an electrical control subsystem and a computer control subsystem.

5. The air vehicle of claim 1 wherein the initial inflation system store and generates the one or more compressed fluids.

6. The air vehicle of claim 1 wherein the initial inflation system comprises one or more storage devices containing a first compressed fluid selected from the group comprising nitrogen, helium, compressed air, ammonia, and a mixture thereof.

7. The air vehicle of claim 1 wherein the initial inflation system comprises one or more generator devices for generating a second compressed fluid comprising gaseous combustion products from a combusted propellant, wherein the gaseous combustion products are selected from the group comprising carbon dioxide gas, carbon monoxide gas, hydrogen gas, nitrogen gas, helium gas, oxygen, and a mixture thereof.

8. The air vehicle of claim 1 comprising an unmanned air vehicle that is removably attached to a space vehicle that is launched into space and that is detached from the space vehicle after the space vehicle re-enters a planet's atmosphere, and further wherein the detachable inflation system is detached from the unmanned air vehicle after the at least one inflatable structure is inflated after the unmanned air vehicle descends through the planet's atmosphere.

9. An air vehicle comprising:
   a fuselage;
   at least one inflatable structure, the inflatable structure being inflatable and having an inflation distribution system for distributing one or more compressed fluids into the inflatable structure to inflate the inflatable structure;
   a replenishment system positioned in the air vehicle for distributing an additional amount of the one or more compressed fluids into an inflated inflatable structure to replace lost differential pressure;
   a detachable inflation system detachably positioned on an external surface of the fuselage, the detachable inflation system comprising:
      a pallet structure;
      an initial inflation system attached to the pallet structure that provides the one or more compressed fluids and distributes the one or more compressed fluids to the inflation distribution system; and,
      a detachable parachute;
   a separation system for separating the detachable inflation system from the air vehicle, the separation system comprising one or more releasable interface attachments between the detachable inflation system and the air vehicle; and,
   a control system comprising an electrical control subsystem and a computer control subsystem.

10. The air vehicle of claim 9, wherein the inflatable structure is selected from the group comprising one or more wings, a tail, one or more canards, one or more fuselage sections, one or more aero fairing doors, one or more recovery systems, and one or more cavity fillers.

11. The air vehicle of claim 9 wherein the initial inflation system store and generates the one or more compressed fluids.

12. The air vehicle of claim 9 wherein the initial inflation system comprises one or more storage devices containing a first compressed fluid selected from the group comprising nitrogen, helium, compressed air, ammonia, and a mixture thereof.

13. The air vehicle of claim 9 wherein the initial inflation system comprises one or more generator devices for generating a second compressed fluid comprising gaseous combustion products from a combusted propellant, wherein the gaseous combustion products are selected from the group comprising carbon dioxide gas, carbon monoxide gas, hydrogen gas, nitrogen gas, helium gas, oxygen, and a mixture thereof.

14. A detachable inflation system located in an air vehicle having at least one inflatable structure and a replenishment system, the detachable inflation system comprising:
   a pallet structure;
   an initial inflation system, attached to the pallet structure, that provides one or more compressed fluids, the initial inflation system being connected to an inflation distribution system in the air vehicle for distributing the one or more compressed fluids into the inflatable structure to inflate the inflatable structure, the air vehicle comprising the replenishment system for distributing an additional amount of the one or more compressed fluids into the at least one inflatable structure to replace a lost differential pressure; and,
   a detachable parachute; and,
   a separation system for separating the pallet structure, the initial inflation system, and the detachable parachute from the air vehicle, the separation system comprising one or more releasable interface attachments between the detachable inflation system and the air vehicle.

15. The system of claim 14, wherein the inflatable structure is selected from the group comprising one or more wings, a tail, one or more canards, one or more fuselage sections, one or more aero fairing doors, one or more recovery systems, and one or more cavity fillers.

16. The system of claim 14 wherein the initial inflation system stores and generates the one or more compressed fluids.

17. The system of claim 14 wherein the initial inflation system comprises one or more storage devices containing a first compressed fluid selected from the group comprising nitrogen, helium, compressed air, ammonia, and a mixture thereof.

18. The system of claim 14 wherein the initial inflation system comprises one or more generator devices for generating a second compressed fluid comprising gaseous combustion products from a combusted propellant, wherein the gaseous combustion products are selected from the group comprising carbon dioxide gas, carbon monoxide gas, hydrogen gas, nitrogen gas, helium gas, oxygen, and a mixture thereof.

19. A method of operating an air vehicle comprising:
   providing an air vehicle having a fuselage and at least one inflatable structure comprising one or more inflatable wings, the inflatable structure being inflatable and having an inflation distribution system for distributing one or more compressed fluids into the inflatable structure to inflate the inflatable structure;
   inflating the one or more inflatable wings on the air vehicle using an initial inflation system mounted on a detachable inflation system, the detachable inflation system being externally and detachably positioned on the air vehicle;
   separating the detachable inflation system from the air vehicle using a separation system comprising one or more releasable interface attachments between the detachable inflation system and the air vehicle; and,
   distributing an additional amount of the one or more compressed fluids into the at least one inflatable structure to replace a lost differential pressure by using a replenishment system positioned in the air vehicle.

20. The method of claim 19 wherein separating the detachable inflation system from the air vehicle further comprises separating a pallet structure and a detachable parachute positioned on the pallet structure.

21. The method of claim 19 further comprising inflating an inflatable tail on the air vehicle using the initial inflation system mounted on the detachable inflation system.

22. The method of claim 19 further comprises storing and generating the one or more compressed fluids using the initial inflation system.

* * * * *